United States Patent
Corr

(12) 
(10) Patent No.: US 6,241,137 B1
(45) Date of Patent: Jun. 5, 2001

(54) REMOVABLE DECK/PLATFORM APPARATUS WITH STORAGE ACCESS FOR SPORT UTILITY VEHICLES, PICKUP TRUCKS AND MINI VANS

(76) Inventor: Caven W. Corr, 72 Charles Ave., Baytown, TX (US) 77520

( * ) Notice: Subject to any disclaimer, the term of this patent is extended or adjusted under 35 U.S.C. 154(b) by 0 days.

(21) Appl. No.: 09/059,510

(22) Filed: Apr. 13, 1998

Related U.S. Application Data

(60) Provisional application No. 60/043,827, filed on Apr. 14, 1997.

(51) Int. Cl.$^7$ .................................................. B60R 9/00
(52) U.S. Cl. ..................... 224/542; 224/404; 224/539; 296/37.1; 296/37.6; 220/23.8
(58) Field of Search .................... 224/539, 542, 224/42.33, 42.32, 404; 296/37.1, 37.6, 24.1; 220/23.8

(56) References Cited

U.S. PATENT DOCUMENTS

| | | |
|---|---|---|
| D. 347,611 | 6/1994 | Phillips . |
| 3,806,183 | 4/1974 | Sieren . |
| 4,443,034 | 4/1984 | Beggs . |
| 4,733,898 * | 3/1988 | Williams ............................ 224/542 |
| 4,832,242 * | 5/1989 | Leek .................................. 224/539 |
| 5,239,934 * | 8/1993 | Miller et al. .................... 296/37.6 X |
| 5,441,183 * | 8/1995 | Frenzel .............................. 224/542 |
| 5,498,048 * | 3/1996 | Shelby, Jr. ........................ 296/37.6 |
| 5,564,768 | 10/1996 | Saffold . |
| 5,564,776 * | 10/1996 | Schlachter .......................... 224/404 |
| 5,568,890 * | 10/1996 | Magee et al. ....................... 224/539 |
| 5,598,962 | 2/1997 | Schlachter . |
| 5,636,890 | 6/1997 | Cooper . |
| 5,683,132 | 11/1997 | Danzo et al. . |
| 5,687,895 * | 11/1997 | Allison et al. ...................... 224/542 |
| 5,979,725 * | 11/1999 | Lehrman ............................ 224/539 |

* cited by examiner

Primary Examiner—Stephen K. Cronin
(74) Attorney, Agent, or Firm—Kenneth A. Roddy

(57) ABSTRACT

A removable deck/platform apparatus for the cargo area of sport/utility vehicles, pickup trucks, mini vans and/or other similar vehicles. The deck/platform apparatus is formed of forward and aft deck members each with integrally molded depending enclosures that serve as storage compartments and as elevating supports for the respective deck. The two deck members may be placed end-to end to form a larger deck/platform that generally conforms to the interior boundaries of the vehicle cargo area when the rear seats are reclined and stowed and may serve as a sleeping deck for supporting two adults. The storage compartments elevate the deck portions above the floor of the cargo area to define a large under-deck storage area for storing personal articles out of view. The storage compartments are provided with hinged lids for easy access from the top of the deck. One of the storage compartments of the forward deck is thermally insulated to serve as a cooler. The forward and aft deck members may also be installed in the cargo area of a vehicle individually or stacked, one on the other, as the situation or needs of the user warrant.

4 Claims, 4 Drawing Sheets

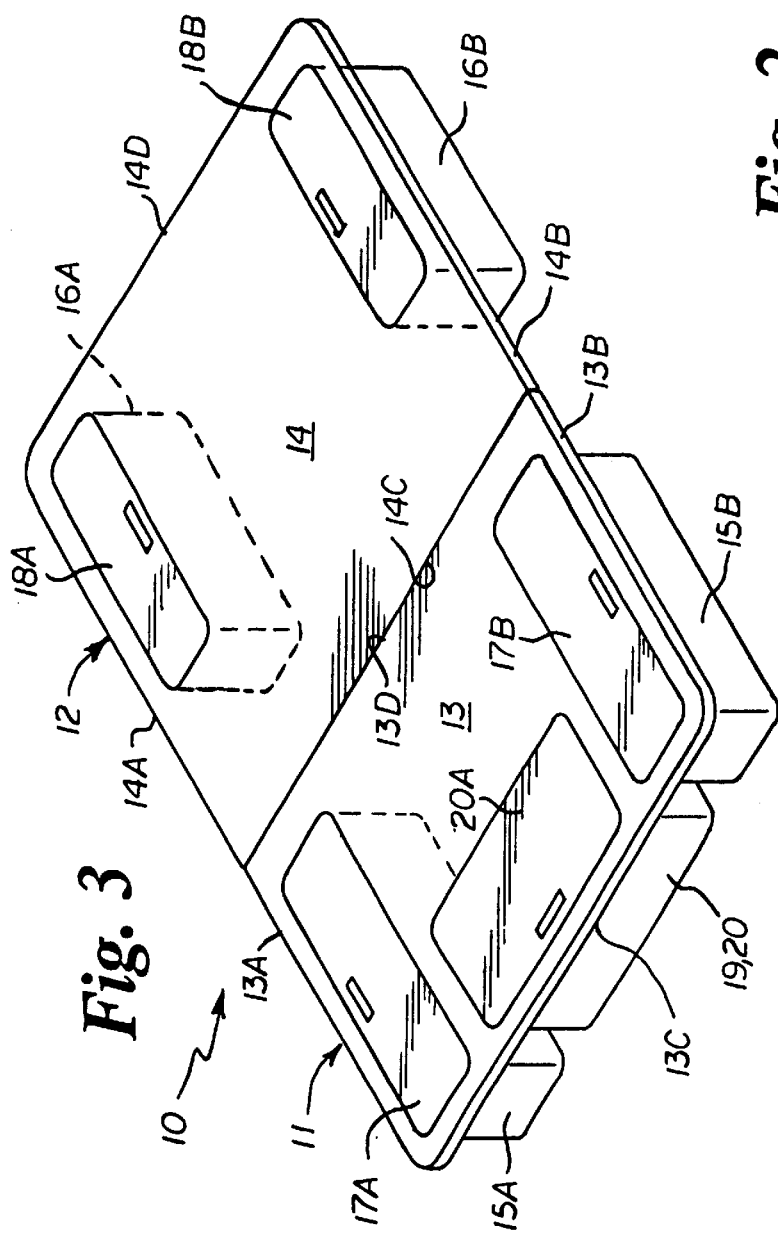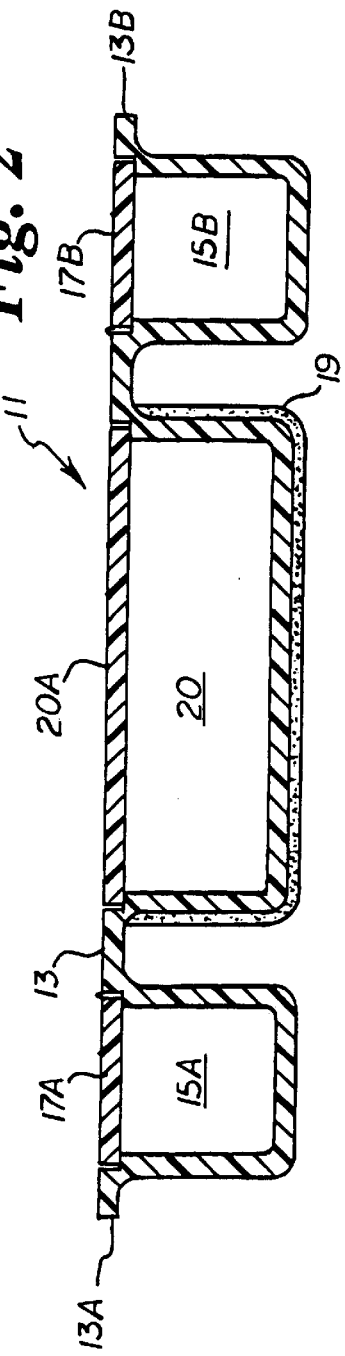

REMOVABLE DECK/PLATFORM APPARATUS WITH STORAGE ACCESS FOR SPORT UTILITY VEHICLES, PICKUP TRUCKS AND MINI VANS

CROSS REFERENCE TO RELATED APPLICATION

This application claims priority of U.S. Provisional Application Serial No. 60/043,827, filed Apr. 14, 1997.

BACKGROUND OF THE INVENTION

1. Field of the Invention

This invention relates generally to the field of automotive accessories, and more particularly to a removable deck/platform apparatus with storage access for sport utility vehicles, pickup trucks, and mini vans.

2. Brief Description of the Prior Art

For several years now, the "sport utility vehicle" (SUV) has become one of the post popular vehicles manufactured and sold. A combination between a truck and a van, SUV's have long combined the enclosed utility of a van with the ruggedness of a truck. However, within the last few years, the SUV has been increasing in popularity as the primary family car of choice. Young families are discovering the versatility that a sport utility vehicle offers. Whether taking the kids to school or soccer practice, grocery shopping, gathering supplies for that weekend project, or running out into the country to "get away from it all," the sport utility vehicle is redefining the term "family car".

With a larger cargo area than most passenger vehicles, an SUV poses several interesting dilemmas—how to utilize this cargo area efficiently and how to protect one's personal property from would-be thieves. Another dilemma presents itself when, on an outdoor recreational junket, an SUV owner needs to sleep in the vehicle in an area where a sleeping facility is either not available or not allowed. This would require either sleeping in the front seat of the vehicle, or haphazardly removing and relocating items stored in the cargo area. This may also require storing some personal items outside of the vehicle, exposed to the elements. Neither prospect holds much potential for a restful night.

There are several patents that disclose various apparatus that fit into the cargo area of a vehicle to facilitate compartmentalized storage and hiding of articles from view for security. Most of these involve some form of box, usually with a cover. Some show different forms of compartmentalizing, similar to a closet, while others are merely carpet protectors.

Cooper, U.S. Pat. No. 5,636,890 discloses a tub-shaped container with a lid. It does not provide a raised platform and below deck storage, lidded enclosures, and would not be suitable to support the weight of two adults.

Frenzel, U.S. Pat. No. 5,441,183 discloses a free-standing storage unit in the form of a boxed enclosure accessed through a platform by a door in the platform. It does not provide storage enclosures and sufficient below deck storage capability.

Schlachter, U.S. Pat. No. 5,598,962 discloses a removable security trunk for sport utility vehicles that attempts to solve the security issue through the use of a horizontal panel that is slidably received in sliding connectors attached to the sides of the cargo area and a pair of vertical panels that form three under-deck storage compartment areas which are hidden from view. The hidden storage is under the platform or deck which could limit access to some articles. It requires assembly and does not provide easily accessible storage enclosures and is not suggested to accommodate the weight of two adults.

Saffold, U.S. Pat. 5,564,768 discloses a portable security trunk that creates a large, fully enclosed trunk for the rear bed of trucks and sport utility vehicles.

Beggs, U.S. Pat. No. 4,443,034 discloses a folding platform for a vehicle comprising a series of hinged panels which may be unfolded within the vehicle to form load carrying shelves or a platform which may be used to support a mattress and may be folded and stowed so as not to interfere with the regular storage compartment.

Sieren, et al, U.S. Pat. No. 3,806,183 discloses a shielded storage compartment for van-type vehicles comprising storage compartments mounted in the rear cargo area of a vehicle that resembles a small storage closet.

Danzo, et al, U.S. Pat. No. 5,683,132 discloses a plastic liner molded to conform to the rear cargo area only of a sport utility vehicle that is placed directly on the cargo area floor and a part of each side wall.

The present invention is distinguished over the prior art in general, and these patents in particular by a removable deck/platform apparatus for the cargo area of sport/utility vehicles, pickup trucks, mini vans and/or other similar vehicles wherein the deck/platform apparatus is formed of forward and aft deck members each with integrally molded depending enclosures that serve as storage compartments and as elevating supports for the respective deck. The two deck members may be placed end-to end to form a larger deck/platform that generally conforms to the interior boundaries of the vehicle cargo area when the rear seats are reclined and stowed and may serve as a sleeping deck for supporting two adults. The storage compartments elevate the deck portions above the floor of the cargo area to define a large under-deck storage area for storing personal articles out of view. The storage compartments are provided with hinged lids for easy access from the top of the deck. One of the storage compartments of the forward deck is thermally insulated to serve as a cooler. The forward and aft deck members may also be installed in the cargo area of a vehicle individually or stacked, one on the other, as the situation or needs of the user warrant.

As the sport utility vehicle continues its popularity with consumers, owners will require assistance in maximizing the use of such a versatile vehicle. With large cargo areas, the present invention would help an SUV owner utilize his/her vehicle more efficiently, and provide organization and security of personal property stored in their vehicle.

SUMMARY OF THE INVENTION

It is therefore an object of the present invention to provide a removable deck/platform that provides security in a vehicle by storing personal articles "out of view" below the deck surface.

It is another object of this invention to provide a removable deck/platform having easily accessible covered enclosures for organized storage of personal articles.

Another object of this invention is to provide a removable deck/platform for vehicles that has a large well-supported sleeping platform that may be used to support the weight of two adults.

Another object of this invention is to provide a removable deck/platform for vehicles that will extend the usable storage capability of a sport utility vehicle.

Another object of this invention is to provide a pair of removable deck/platforms that may be installed in the cargo area of a vehicle individually or stacked, one on the other, as the situation or needs of the user warrant.

Another object of this invention is to provide a removable deck/platform for vehicles having an easily accessible insulated storage enclosure that serves as a cooler for beverages or perishable food items.

A further object of this invention is to provide a removable deck/platform that will protect the vehicle carpet and cargo area from damage.

A still further object of this invention is to provide a removable deck/platform that is of lightweight construction and designed to facilitate ease of installation, manipulation, removal, and cleaning.

Other objects and advantages of the present invention will become apparent from the following descriptions, taken in connection with the accompanying drawings, wherein, by way of illustration and example, an embodiment of the present invention is disclosed.

The above noted objects and other objects of the invention are accomplished by a removable deck/platform apparatus for the cargo area of sport/utility vehicles, pickup trucks, mini vans and/or other similar vehicles. The deck/platform apparatus is formed of forward and aft deck members each with integrally molded depending enclosures that serve as storage compartments and as elevating supports for the respective deck. The two deck members may be placed end-to end to form a larger deck/platform that generally conforms to the interior boundaries of the vehicle cargo area when the rear seats are reclined and stowed and may serve as a sleeping deck for supporting two adults. The storage compartments elevate the deck portions above the floor of the cargo area to define a large under-deck storage area for storing personal articles out of view. The storage compartments are provided with hinged lids for easy access from the top of the deck. One of the storage compartments of the forward deck is thermally insulated to serve as a cooler. The forward and aft deck members may also be installed in the cargo area of a vehicle individually or stacked, one on the other, as the situation or needs of the user warrant.

BRIEF DESCRIPTION OF THE DRAWINGS

FIG. 2 is a transverse cross sectional view through the forward deck member taken along line 2—2 of FIG. 1, in larger scale, showing the storage compartments in greater detail.

FIG. 3 is an isometric view of the removable deck/platform apparatus in accordance with the present invention, showing the forward and aft deck members placed end-to-end.

DESCRIPTION OF THE PREFERRED EMBODIMENT

Figure 1:
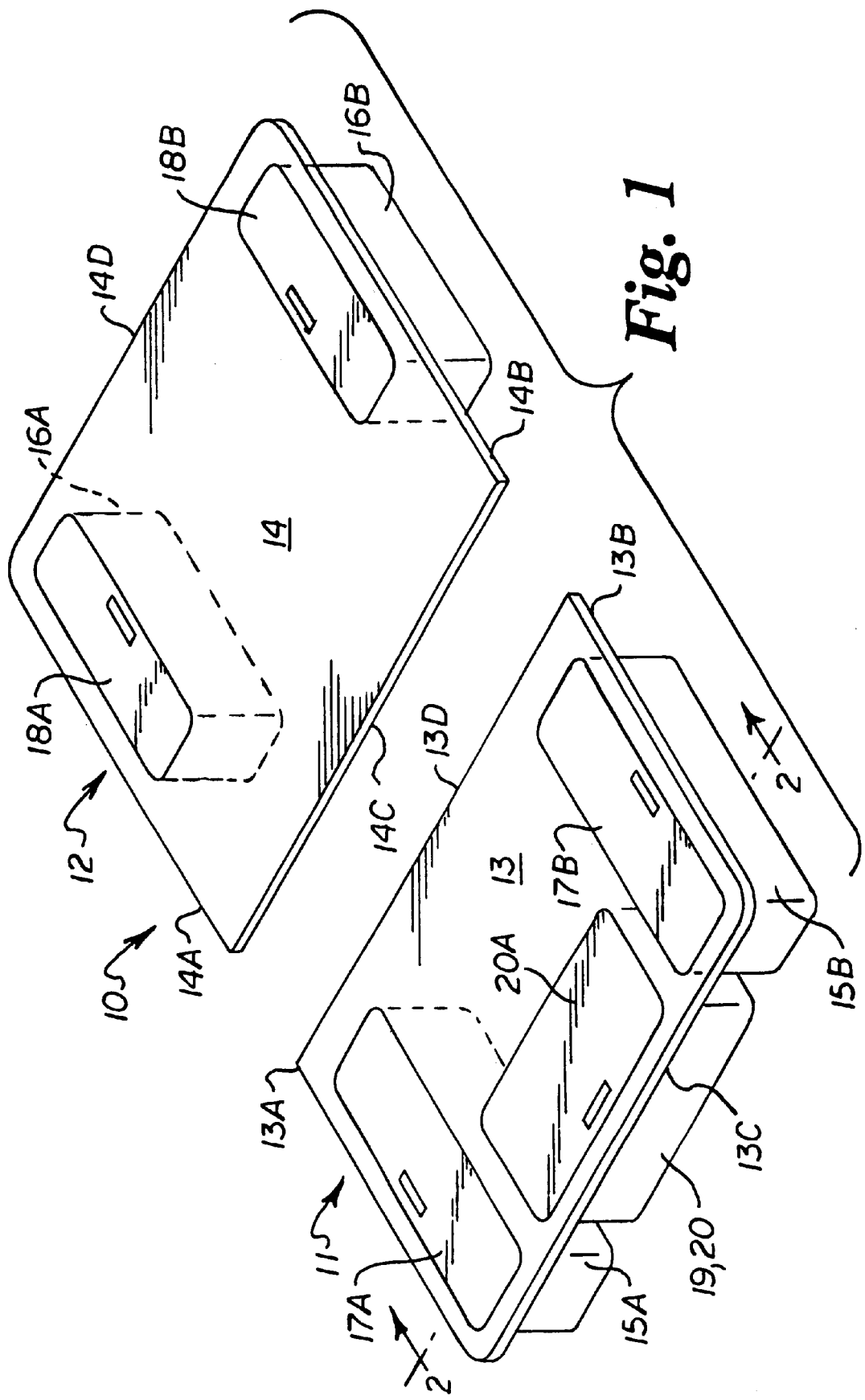
FIG. 1 is an isometric view of the removable deck/platform apparatus in accordance with the present invention, showing the forward and aft deck members in an unassembled condition.

Referring to the drawings by numerals of reference there is shown in FIG. 1, a preferred removable deck/platform apparatus 10 for the cargo area of sport/utility vehicles, pickup trucks, mini vans and/or other similar vehicles. The deck/platform apparatus 10 is formed of a forward deck member 11 and an aft deck member 12 molded of rigid material having sufficient strength to accommodate the weight of two average adults. The forward deck member 11 has a generally flat rectangular deck portion 13 with parallel spaced lateral sides 13A,13B and parallel spaced front and rear ends 13C,13D, respectively. Similarly, the aft deck member 12 has a generally flat rectangular deck portion 14 with parallel spaced lateral sides 14A,14B and parallel spaced front and rear ends 14C,14D, respectively.

Each deck member 11,12 has a pair of generally rectangular integrally molded depending enclosures, one near each of their lateral sides 13A,13B and 14A,14B, respectively, that serve as storage compartments 15A,15B and 16A,16B, and also as elevating supports for the respective deck portions. The respective storage compartments 15A,15B and 16A,16B are provided with a hinged lid 17A,17B and 18A,18B for easy access to their interior from the top of the respective deck portions.

As best seen in FIG. 2, the forward deck member 11 has a larger generally rectangular integrally molded depending enclosure near its front end 13C which is surrounded by a layer of thermal insulation 19 to serve as a cooler 20 for storing beverages or perishable food items. The enclosure or cooler 20 also serves as an additional elevating support for the forward deck 11. The enclosure or cooler 20 is provided with a hinged lid 20A for easy access to beverages and/or perishable food items stored therein. As seen in FIGS. 1 and 2, each of the lids 17A,17B,18A,18B and 20A in their closed condition, are generally flush with a top surface of the respective deck portions 13 and 14.

Figure 4:
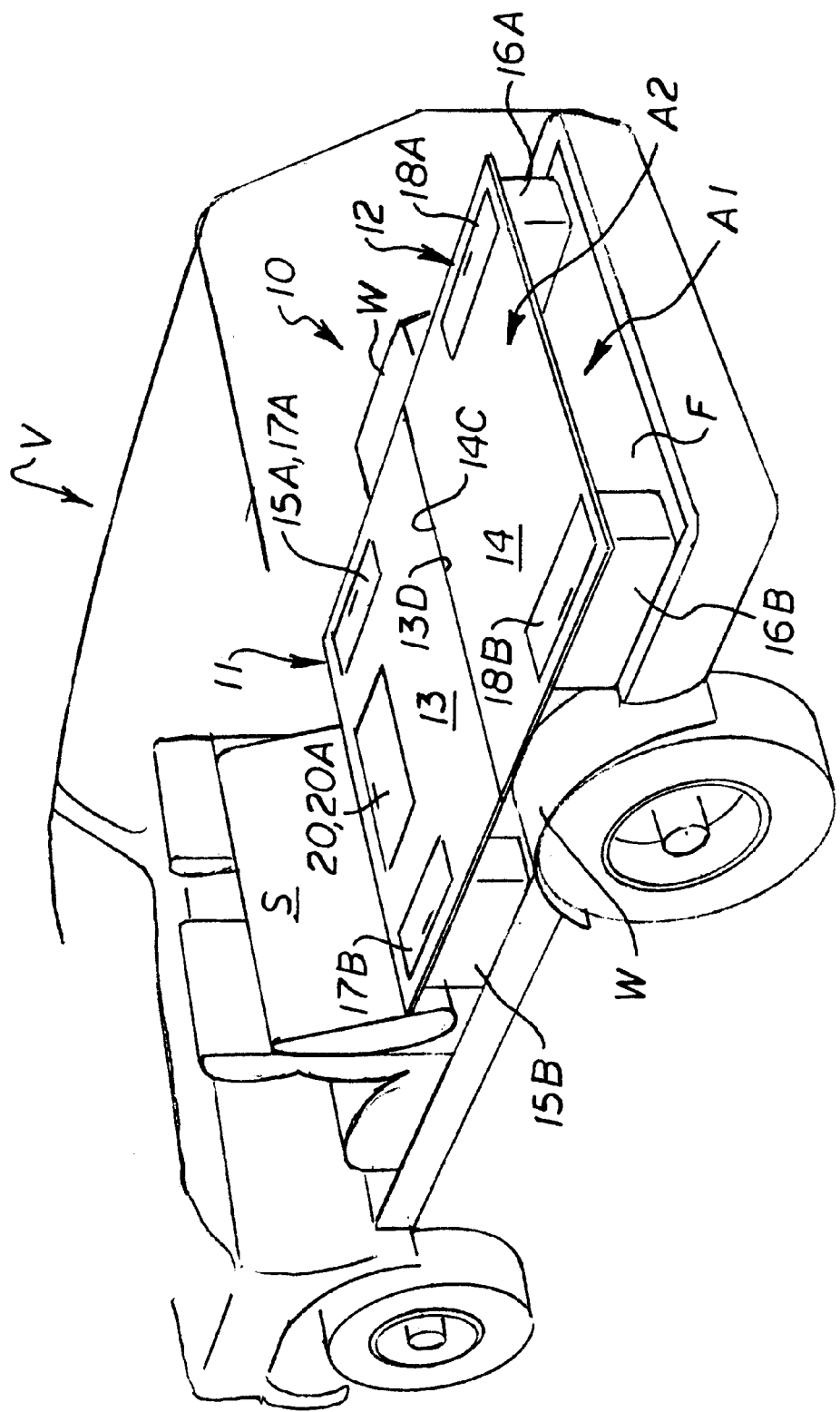
FIG. 4 is a cut-away perspective view of a typical sport utility vehicle, shown schematically, with the forward and aft deck members of the removable deck/platform apparatus installed therein in an end-to-end configuration.

As shown in FIGS. 3 and 4, the forward and aft deck members 13 and 14 may be placed end-to end with the front end 14A of the aft deck portion 14 abutting the rear end 13D of the forward deck portion 13 to form a larger deck/platform that is sized to generally conform to the interior boundaries of the vehicle cargo area when the rear seats of the vehicle are reclined and stowed, and may serve as a sleeping deck for supporting two adults.

FIG. 4 shows, schematically, a cut-away of a typical sport utility vehicle V with the forward and aft deck members 11 and 12 installed end-to end on the floor F of the extended cargo area of the vehicle with the vehicle rear seats S in a stowed position. Access to the cargo area of the vehicle, for installation, is usually through the rear cargo door or tailgate area of the vehicle (not shown). The forward deck member 11 is placed with its depending enclosures or compartments 15A and 15B forward of the rear wheel wells W and supported on the floor area F behind the stowed rear seats S. The aft deck member 12 is placed directly behind the forward deck member 11 with its enclosures or compartments 16A and 16B supported on the floor area F rearward of the wheel wells W and its front end 14C abutting the rear end 13D of the forward deck member 11.

The depending enclosures or compartments 15A,15B, 16A,16B and 20 support the deck portions 13 and 14 an elevated distance above the cargo area floor F, forming a relatively large below-deck storage area A1 and an above-deck area A2. The below deck storage area A1 conceals stored items from view and can accommodate a variety of items, from fishing poles and firearms to low profile boxes. The above-deck area A2 is of sufficient size and strength to accommodate the weight of two average adults and can serve as a sleeping deck or may be used for additional storage organization. The smaller rectangular storage compartments 15A,15B,16A and 16B provide additional storage space for organization and storage of smaller items, and the insulated cooler 20 may be used for storing beverages and/or perishable food items. The smaller rectangular storage compartments 15A,15B,16A and 16B and the insulated cooler 20 are easily accessible from the above-deck area A2.

Figure 5:
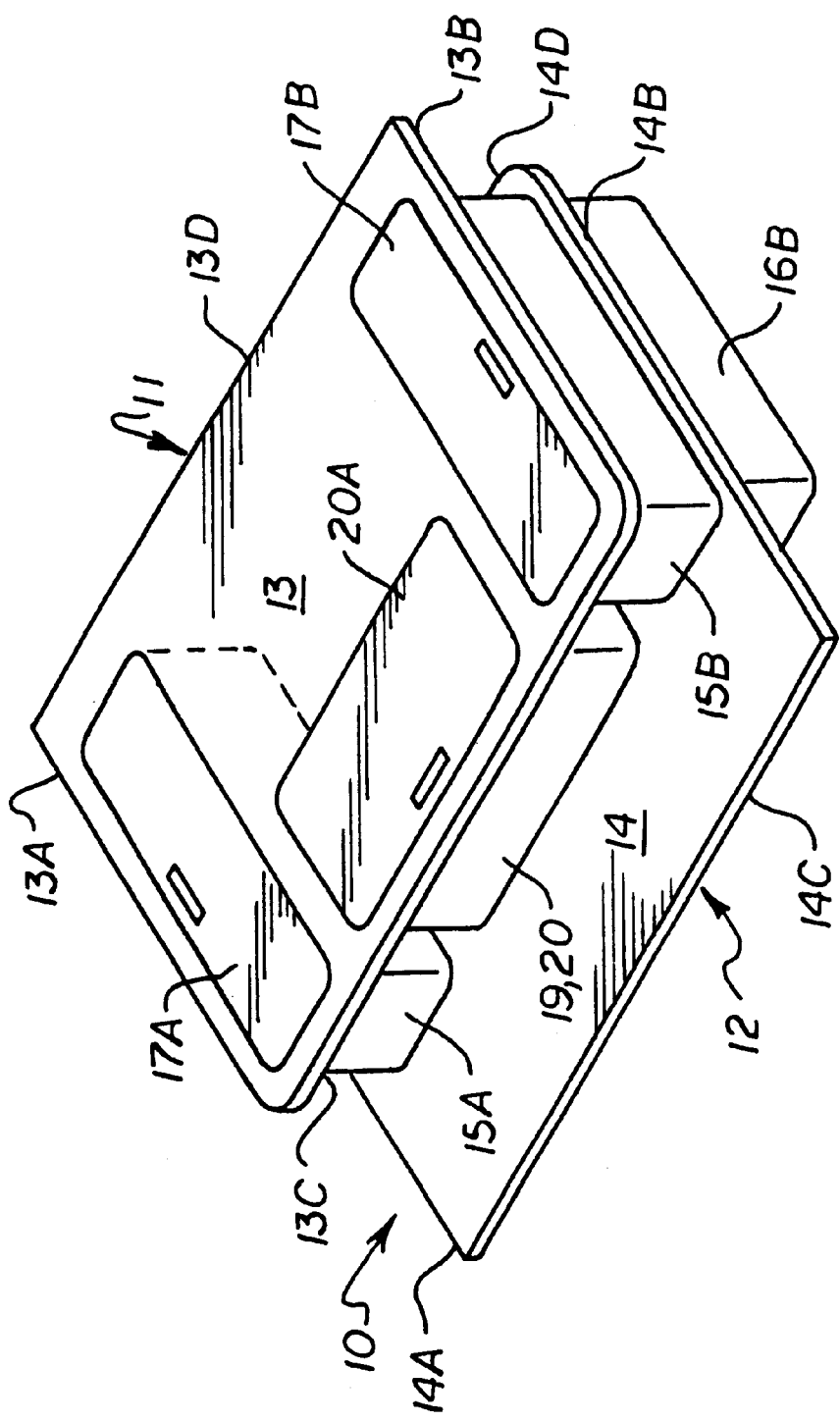
FIG. 5 is an isometric view of the removable deck/platform showing the forward and aft deck members in a stacked configuration.

The forward and aft deck members 11 and 12 may also be installed in the cargo area of a vehicle individually, or as shown in FIG. 5. stacked, one on the other, as the situation or needs of the user warrant.

For example, should it be necessary to convey passengers in the rear seats of the vehicle, the aft deck member 12 may be installed in the rear cargo area, behind the installed rear seats, to create a somewhat smaller storage area. The forward deck member 11 may optionally be placed on top of the aft deck member 12 (FIG. 5) to provide for additional storage organization and security.

Although the deck/platform apparatus has been described as being installed in a sport utility vehicle, it should be understood that it may be used to organize storage and provide security in other vehicle types with similar cargo area capabilities. This would include various pickup trucks, vans, mini vans and other vehicles equipped with cargo areas that could accommodate the present deck/platform apparatus.

While this invention has been described fully and completely with special emphasis upon a preferred embodiment, it should be understood that within the scope of the appended claims the invention may be practiced otherwise than as specifically described herein.

For example, the removable deck/platform may be provided with attached or removable vertical panels to facilitate various storage area configurations. Drawers or sliding bins may also be added that would slide under accessible areas of the below-deck storage area. It would also be possible to create a "secret" compartment, for valuables, in any area on the underside of the deck portions. Elevating and/or lowering devices may also be provided that would alter the overall height of the deck portions above the cargo area floor for storing larger or taller articles in the under-deck storage area.

What is claimed is:

1. A removable deck/platform storage system for selective removable installation in the cargo area of a vehicle, comprising:

a forward deck member having a generally rectangular flat deck portion with laterally opposed sides and opposed front and rear ends, a pair of generally rectangular storage compartments, each disposed near a respective one of said laterally opposed sides and having a lower portion depending from an underside of said forward deck member deck portion sized and shaped to be received on a floor surface of the vehicle cargo area for supporting said forward deck member deck portion a distance horizontally above said floor surface;

an aft deck member having a generally rectangular flat deck portion with laterally opposed sides and opposed front and rear ends, a pair of generally rectangular storage compartments, each disposed near a respective one of said laterally opposed sides and having a lower portion depending from an underside of said aft deck member deck portion sized and shaped to be received on a floor surface of the vehicle cargo area to support said aft deck member deck portion a distance horizontally above said floor surface;

a lid disposed at an upper end of each said storage compartment for enclosing each respective said storage compartment, each of said lids being generally flush with a top surface of said deck portions in a closed position;

said depending storage compartments having an exterior sized and shaped to support said deck portions in a horizontal plane a distance above the floor of the cargo area floor to define a below-deck storage area therebetween for storing items therein concealed from view and an above-deck storage area above said deck portions;

said generally rectangular storage compartments having an interior sized and shaped to provide additional storage space for storage of smaller items and said forward deck member and said aft deck member sized to be selectively received in said vehicle cargo area in stacked relation one supported atop the other, wherein;

said depending storage compartments of the lowermost one of said forward or aft deck member support said lowermost deck member deck portion horizontally a distance above the floor of the cargo area floor to define a below-deck storage area therebetween for storing items therein concealed from view; and said depending storage compartments of the uppermost one of said forward or aft deck member are engaged on a top surface of said lowermost deck member and support said uppermost deck member deck portion a distance above said top surface of said lowermost deck member in generally parallel vertically spaced relation to define a below-deck storage area therebetween for storing items therein concealed from view and an above-deck storage area above said uppermost deck portion.

2. The removable deck/platform storage system according to claim 1, further comprising:

a third generally rectangular storage compartment disposed near said forward deck member deck portion front end and having a lower portion depending from an underside of its said deck portion sized and shaped to be received on a floor surface of the vehicle cargo area to additionally support said deck portion a distance horizontally above said floor surface; and a lid disposed at an open top end of said third storage compartment for enclosing said third storage compartment, and being generally flush with a top surface of its said deck portion in a closed position and accessible from said above-deck area.

3. The removable deck/platform apparatus according to claim 2, wherein said third storage compartment is thermally insulated to serve as a cooler for storing beverages and perishable food items therein.

4. The removable deck/platform storage system according to claim 1, wherein said forward deck member and said aft deck member are sized to be received in said vehicle cargo area in end-to end relation with said front end of said aft deck member deck portion abutting said rear end of said forward deck member deck portion in a horizontal plane to form a deck of sufficient size to accommodate two adults in a prone sleeping position.

* * * * *